(No Model.) 2 Sheets—Sheet 1.

J. W. KESLER.
PLANTER AND CULTIVATOR.

No. 580,526. Patented Apr. 13, 1897.

Witnesses
D. H. Blakelock
John C. Wilson

Inventor
John W. Kesler,
by Whitman & Wilkinson,
Attorneys.

THE NORRIS PETERS CO., PHOTO-LITHO., WASHINGTON, D. C.

(No Model.)  2 Sheets—Sheet 2.

J. W. KESLER.
PLANTER AND CULTIVATOR.

No. 580,526. Patented Apr. 13, 1897.

Witnesses
D. H. Blakelock
John C. Wilson

Inventor
John W. Kesler,
by Whitman & Wilkinson,
Attorneys

UNITED STATES PATENT OFFICE.

JOHN W. KESLER, OF URENA, GEORGIA.

PLANTER AND CULTIVATOR.

SPECIFICATION forming part of Letters Patent No. 580,526, dated April 13, 1897.

Application filed July 22, 1896. Serial No. 600,144. (No model.)

*To all whom it may concern:*

Be it known that I, JOHN W. KESLER, a citizen of the United States, residing at Urena, in the county of Banks and State of Georgia, have invented certain new and useful Improvements in a Combined Seed-Planter and Cultivator; and I do hereby declare the following to be a full, clear, and exact description of the invention, such as will enable others skilled in the art to which it appertains to make and use the same.

My invention relates to improvements in plows; and it consists of the novel combination single-foot plow, cultivator, and seed-planter hereinafter described and claimed.

My invention will be understood by reference to the accompanying drawings, wherein the same parts are indicated by the same letters throughout the several views.

Figure 1:
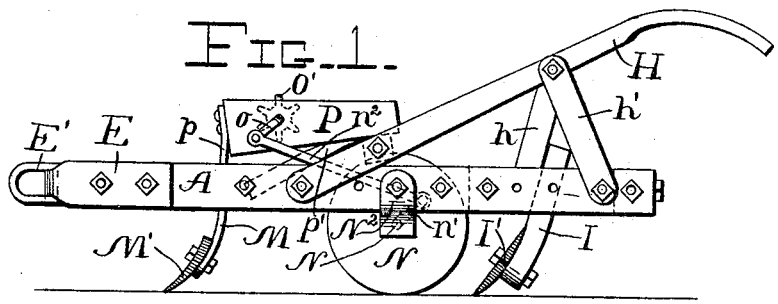
Figure 2:
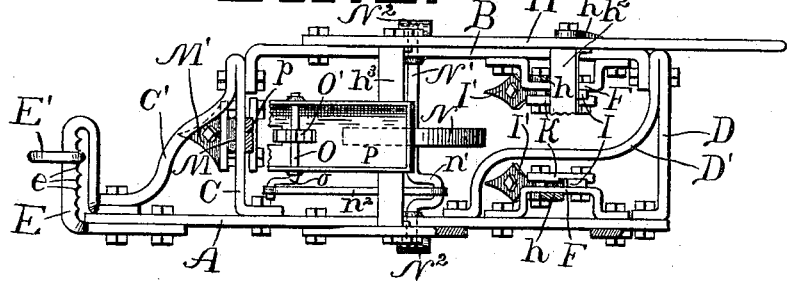
Figure 3:
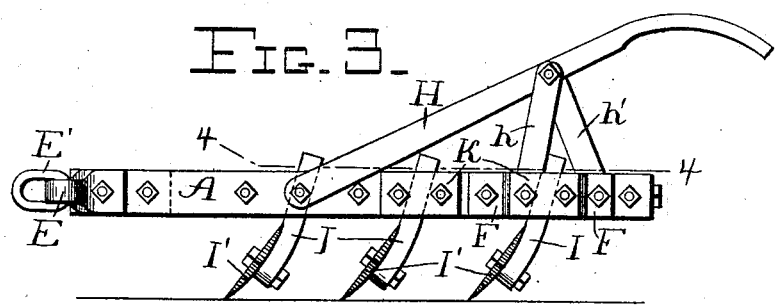
Figure 4:
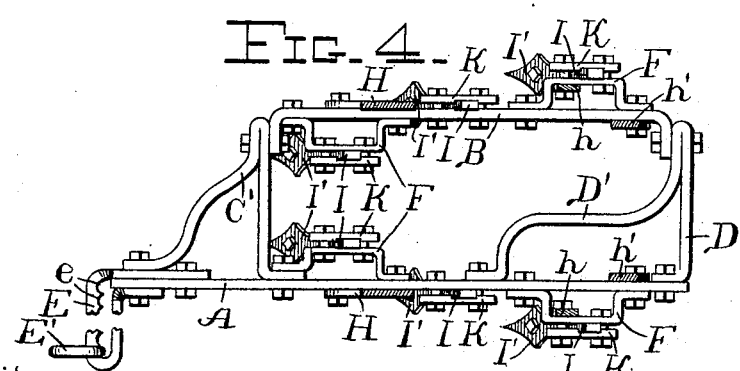
Figure 5:
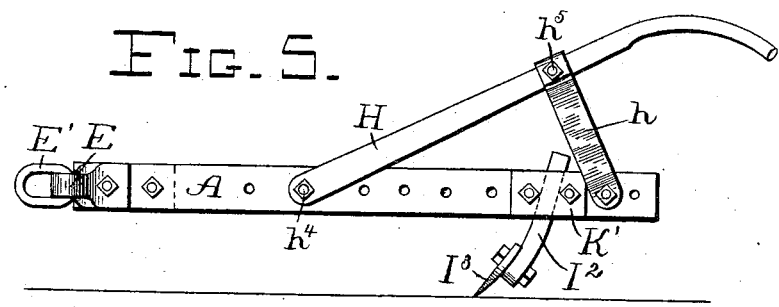
Figure 6:
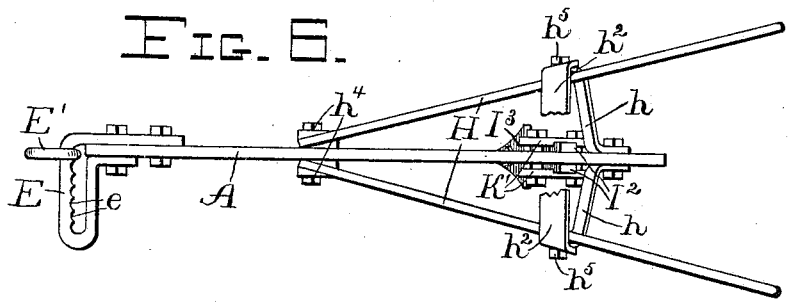
Figure 7:
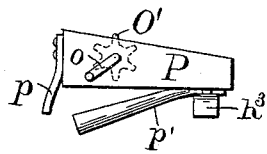
Figure 9:
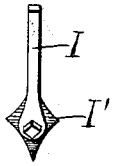
Figure 10:
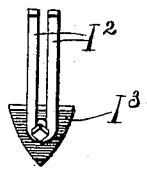
Figures 8, 11, 12:
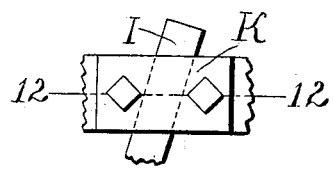

Figure 1 is a side elevation of my combination plow used as a seed-planter. Fig. 2 is a top plan view of the same, parts being broken away. Fig. 3 is a side elevation of my plow equipped for use as a straddle-row cultivator. Fig. 4 is a top plan view, partly in section, taken on the line 4 4 of Fig. 3. Fig. 5 is a side elevation of my plow equipped for use as a single-foot plow. Fig. 6 is a top plan view of the plow as shown in Fig. 5, parts being broken away. Fig. 7 is a detail side elevation of the seed-hopper shown in Figs. 1 and 2. Fig. 8 is a top plan view of the hopper shown in Fig. 7. Fig. 9 is a rear elevation of one of the cultivator-standards with diamond hoe attached shown in Figs. 3 and 4. Fig. 10 is a rear elevation of the standard and hoe shown in Figs. 5 and 6. Fig. 11 is an enlarged detail side elevation of a portion of one of the side beams and standards of the plow used as a cultivator, showing the manner of attaching the standard to the beam; and Fig. 12 is a section taken on the line 12 12 of Fig. 11.

Referring more particularly to Figs. 1 to 4, A represents one side beam, and B represents a shorter side beam which is connected to the beam A by means of cross-pieces C and D, provided with curved braces C' and D', respectively, and suitable bolts passing through the various parts.

E represents an elongated link which is bolted rigidly to the front end of the beam A and which is provided with notches $e$ for the adjustment of a ring E', to which the doubletree is attached.

H represents handles provided with upright braces $h\ h'$ and cross-bar $h^2$. These handles, braces, and the cross-bar are held together by bolts which may be readily removed or adjusted, as shown in Figs. 1 to 3.

F represents side frames which are bolted to the beams A and B and which may be detached and readily adjusted from one side of each of said beams to the other, as desired.

I represents the standards which carry the hoes or points I', and these standards are adapted to be clamped either to the side frames F by means of plates K, secured to the said side frames, or beams by means of suitable bolts, as shown most clearly in Fig. 4. In this figure the plow is shown as adjusted for use as a straddle-row cultivator, the rear pair of side frames F being attached to the outside of the beams A and B, the front pair of said side frames F being attached to the inside of said beams A and B, and to these side frames the shanks of the standards I are clamped, as above described, while the intermediate standards are clamped directly to the beams A and B, respectively. In this view the fixed link E is adjusted to the beam A, so that the cultivator may be drawn by a single horse, which would walk between the rows being cultivated, but this link may be adjusted as shown in Fig. 2 should a pair of horses be used, thus allowing one horse to walk on each side of the row being cultivated.

For use as a seed-planter the forward side frames F and the standards attached thereto are removed, as well as the intermediate standards shown in Fig. 4, and the rear side frames F are adjusted from the outside of the beam to the inside thereof, as shown in Fig. 2, thus bringing the two standards and the hoes carried thereby closer together for covering the seed.

M represents a standard which is attached to the cross-piece C by means of a plate K similar to those above described and bolts passing through said plate and said crosspiece, and this standard M carries a shovel M' for opening a furrow for the seed. A wheel N is rigidly mounted upon an axle N', which is cranked, as at $n'$, in order to drive a pitman $n^2$, connected to a crank $o$ on the end of a shaft O, upon which is mounted a toothed wheel or stirrer O' in a hopper P, mounted at one end upon the cross-piece $h^3$, secured to the handles H and supported at its forward end by means of a standard $p$, bolted thereto and held upon the cross-piece C. The axle N' is journaled in suitable bearings connected to the beams A and B, and is held against longitudinal displacement by means of plates $N^2$, which bear against the ends of the said axle, as shown in Figs. 1 and 2.

When in use as a seed-planter, the attaching-link E should preferably be adjusted as shown in Figs. 1 and 2, whether for use with one or a pair of horses. The seed runs out to an opening $p^0$ in the bottom of the hopper P and falls upon a spout $p'$, from which it runs into the open furrow behind the shovel M'. The wheel N runs in the furrow and by its rotation keeps the seed stirred up and thus insures a constant flow thereof. The hoes I' are adjusted, as shown in Fig. 2, to straddle the open furrow and cover the seed as the frame is drawn forward.

For use as a single-foot plow all the parts used on the plow as either a cultivator or seed-planter are removed except the beam A and the attaching-link E, connected thereto. The handles H are bolted at their forward ends to the beam A, as shown at $h^4$ in Figs. 5 and 6. The upright braces $h$ are bolted at their lower ends upon the rear end of the beam and are bolted at their upper ends to the handles H and cross-bar $h^2$, as shown at $h^5$ in Figs. 5 and 6.

The bifurcated standard $I^2$, carrying the shovel $I^3$, is clamped upon the beam by means of plates K' and suitable bolts which pass through the said plates and through the beam and securely bind the bifurcated standard $I^2$ upon the beam A with one bifurcation upon each side of the said beam, as shown most clearly in Fig. 6.

The side frames F and the clamping-plates K, as well as the various feet or shanks I, are all made alike and interchangeable, so that no great skill is required in adjusting the various parts for use as either a single-foot plow, cultivator, or seed-planter. The bifurcated foot or shank $I^2$ shown in Fig. 10 will be used only with the single-foot plow. The hopper and the wheel N, with its seed-stirring attachment, as also the foot or standard M, will only be used with the seed-planter. Any pair of the side frames F and feet or standards I may be used with the seed-planter as well as with the cultivator.

The bolts used throughout the plow for connecting similar parts should be of the same size, and thus readily adjusted.

Many other adjustments of my herein-described plow might be made, as will be obvious to any one skilled in the art, and I do not wish to limit myself to the various adjustments and combinations herein described and shown, as these may be varied at will to suit requirements without departing from the spirit of my invention.

My plow may be made entirely of iron or partly of iron and partly of wood, and, the various parts and the bolts connecting them being made interchangeable, my plow may be readily taken apart and adjusted by any ordinary farm-workman.

Having thus described my invention, what I claim, and desire to secure by Letters Patent of the United States, is—

1. In a plow of the character described, the combination with a frame composed of two parallel beams A and B, cross-pieces C and D, connecting the parallel beams near their ends and curved braces C' and D'; of a plurality of side frames F detachably bolted to said beams; a plurality of feet or standards, hoes carried thereby; a plurality of flat plates K and bolts adapted to pass through said plates and through said side frames or said beams, and to bind said standards thereto; and a pair of handles with braces therefor mounted upon said frame, substantially as described.

2. In a plow of the character described, the combination with a frame composed of two parallel beams A and B, cross-pieces C and D, connecting the parallel beams near their ends and bent over upon themselves to form the curved braces C' and D'; of a plurality of side frames F detachably bolted to said beams, a plurality of feet or standards, hoes carried thereby; a plurality of flat plates K and bolts adapted to pass through said plates and through said side frames or said beams, and to bind said standards thereto; the reversible draft-link E provided with notches $e$ for the attachment of the team; and a pair of handles with braces therefor mounted upon said frame, substantially as described.

3. In a plow of the character described, the combination with a frame composed of two parallel beams A and B, cross-pieces C and D, connecting the parallel beams near their ends and bent over upon themselves to form the curved braces C' and D'; of a plurality of side frames F detachably bolted to said beams; a plurality of feet or standards, hoes carried thereby, a plurality of flat plates K and bolts adapted to pass through said plates and through said side frames or said beams, and to bind said standards thereto; a hopper mounted upon said frame, a wheel mounted upon an axle journaled in said frame; a stirring-wheel mounted in said hopper and operated by said wheel; and a pair of handles with braces therefor mounted upon said frame, substantially as described.

4. In a plow of the character described, the combination with a frame composed of two parallel beams A and B, cross-pieces C and D, connecting the parallel beams near their ends and bent over upon themselves to form the curved braces C' and D'; of a plurality of side frames F detachably bolted to said beams; a plurality of feet or standards, hoes carried thereby; a plurality of flat plates K and bolts adapted to pass through said plates and through said side frames or said beams, and to bind said standards thereto; a hopper mounted upon said frame, a wheel mounted upon an axle journaled in said frame, a stirring-wheel mounted in said hopper and operated by said wheel, the reversible draft-link E provided with notches $e$ for the attachment of the team, and a pair of handles with braces therefor mounted upon said frame, substantially as described.

5. In a plow of the character described, the combination with a frame composed of the long beam A and the short beam B, parallel therewith, cross-pieces C and D connecting the parallel beams near their ends and bent over upon themselves to form the braces between said beams; of a plurality of side frames F detachably bolted to said beams and adjustable to either side thereof, a pair of standards or feet and hoes or shovels carried thereby; a pair of flat plates K and bolts adapted to pass through said plates and through one pair of said side frames and to bind said standards thereto; a hopper mounted upon said frame, a wheel mounted upon an axle journaled in said frame, a stirring-wheel mounted in said hopper and operated by said wheel, a spout beneath said hopper, a shovel having a standard mounted upon the cross-piece C in front of said hopper for opening a furrow for the seed; the draft-link E provided with notches $e$ reversibly bolted to the forward ends of the beam A; and a pair of handles with braces therefor, mounted upon said frame, substantially as described.

In testimony whereof I affix my signature in presence of two witnesses.

JOHN W. KESLER.

Witnesses:
A. C. MOSS,
T. E. KEY.